United States Patent Office

3,511,754
Patented May 12, 1970

3,511,754
PROCESS FOR ISOLATING L-ASPARAGINASE
Bernard Berk, Westfield, and Robert S. Robison and John N. Korzun, North Brunswick, N.J., assignors to E. R. Squibb & Sons, Inc., New York, N.Y., a corporation of Delaware
No Drawing. Filed Aug. 24, 1967, Ser. No. 662,868
Int. Cl. C07g 7/028
U.S. Cl. 195—66      4 Claims

ABSTRACT OF THE DISCLOSURE

This invention relates to an improved process for the isolation of the enzyme L-asparaginase from a cell-free extract derived from cells of *Escherichia coli* which comprises treatment of the cell-free extract with acetone.

---

This invention relates to an improved process for the isolation of the enzyme L-asparaginase from a cell-free extract derived from cells of *Escherichia coli* (*E. coli*). More particularly, this invention relates to the treatment of such a cell-free extract with acetone to precipitate the enzyme therefrom.

Other methods of precipitation of the enzyme from such cell-free extracts are known in the art. For example, one such method involves nucleic acid precipitation and a two-stage ammonium sulfate fractionation to remove other proteins.

It has now been discovered, however, that the enzyme may be isolated in greater purity than has heretofore been possible, by merely precipitating with acetone, thereby eliminating the necessity for the second ammonium sulfate fractionation.

In the preparation of the cell-free extracts which are the starting materials of this invention, any cells of *E. coli* may be used, although it is preferred to first dry the cells, as by lyophilization or treatment with acetone. Acetone drying is preferably conducted by suspending a wet cell paste of *E. coli* cells obtained by centrifugation in distilled or deionized water. The cell suspension is then preferably added to cold acetone. After mixing, the acetone-precipitated cells are recovered by filtration and dried.

Cell lysis is then accomplished by any means known in the art, to provide a cell-free extract containing the enzyme. Various means of accomplishing cell lysis are known in the art, such as ultrasonic disruption or other mechanical means, such as grinding, for instance, in a colloid mill. In the preferred embodiment of this invention, however, the lysis is accomplished by subjecting the cells to the action of lysozyme in the manner as set forth in applicant's U.S. application No. 626,383, filed Mar. 28, 1967. In that process, the *E. coli* cells are intermixed with lysozyme in the presence of a buffer to maintain pH at from about 5 to about 9, and the cell debris removed, as by centrifugation to provide the cell-free extract.

Alternatively, cell-free extracts may be obtained from cells of *E. coli*, although in much less purity and yield, by merely subjecting wet cells to grinding, ultrasonic disruption or to the action of lysozyme, as set forth above.

Nucleic acids and other enzymes are precipitated and removed from the cell-free extract by known methods, for instance, by treatment with manganese chloride and ammonium sulfate. After removal of precipitated material, as by centrifugation, the supernatant obtained from these treatments is fractionated with acetone and the enzyme recovered.

Acetone is added in an amount of at least about 25% by volume of the cell-free extract being treated. Any amount of acetone above this minimum may be employed, the upper limit of acetone employed being determined only by considerations of economy of operation.

Preferably, however, the amount of acetone employed will range between about ¼ to about 2 vol./vol. of extract, optimally about 1 vol./vol. The temperature of treatment is preferably maintained between about 0° C. and 10° C., optimally at about 5° C. The acetone fractionation is preferably carried out while agitating, 15 minutes usually being a sufficient time within which to accomplish the fractionation. During this treatment pH is preferably controlled to between about 4.5 to about 8.0, optimally about 7.5. The L-asparaginase so obtained may then be further purified by diethylaminoethylcellulose column chromatography.

By operating in accordance with this invention, it is possible to eliminate a second ammonium sulfate fractionation step heretofore required in prior art processes. Further, the fractionation obtained is much sharper than those heretofore accomplished in the art, resulting in a product having a specific activity of from 2.5 to 15 times that previously obtained by conventional fractionation procedures.

The following examples illustrate the invention (all temperatures being in centigrade).

EXAMPLE 1

(a) Preparation of acetone dried *E. coli* B cells

*E. coli* B is grown under submerged conditions for 20 hours in a suitable medium at 37°. The cells are recovered by centrifugation and then washed with cold pH 8.0 0.05 M sodium phosphate buffer. The washed cells are recovered as a cell paste. From 3,000 liters of whole broth 29.2 kg. of washed cell paste is obtained. This cell paste is suspended in deionized water so that the final volume is 29.5 liters. The cell suspension is added slowly with vigorous agitation to 13.5 liters of acetone at 23° and slurried for 30 minutes. Agitation is stopped and the acetone precipitated cells are allowed to settle for 55 minutes. The cells are recovered by filtration, washed in situ with acetone and vacuum dried. The yield is about 7,762 grams of cells with an L-asparaginase assay at a pH of 5.0 of 16,800 units/gram.

(b) Recovery of the L-asparaginase 250 grams of *E. coli* B acetone powder prepared as described in step (2) are homogenized with 5 liters of 0.05 M sodium phosphate buffer pH 8.0 containing 125 mgs. (0.05%) of lysozyme. The homogenized cell suspension is heated to 38° and incubated for 30 minutes with occasional stirring. After incubation, the mixture is cooled down to about 5° and cell debris removed by centrifugation. All operations are carried out at about 5°. 4.655 liters of cell-free supernatant is obtained. The nucleic acids are precipitated by the addition of 235 ml. of 1M $MnCl_2$. After removal of the precipitated material by centrifugation, the supernatant (4.4 liters) is brought to about 2 molar by the addition of solid $(NH_4)_2SO_4$ (1.29 kg.) with stirring. The suspension is adjusted to pH 8.0 with concentrated $NH_4OH$ and centrifuged to remove the precipitate. To the supernatant (ca. 5.0 liters) at 5–10° C. there is added slowly 5.0 liters of pre-chilled (0–5° C.) acetone. After 15 minutes of agitation, Hyflo is added, the precipitate is removed and suspended in 500 ml. of distilled water; the suspension is filtered, the filtrate dialyzed, and the salt free solution concentrated in vacuum at a temperature of less than 25° C. to 100 ml. containing L-asparaginase at 80 I.U./ml. and at a specific activity of about 5–7 I.U./mg. of protein.

EXAMPLE 2

(a) Preparation of lyophilized *E. coli* B cells

*E. coli* B is grown under submerged conditions for 20 hours in a suitable medium at 37°. The cells are recovered by centrifugation. The cell paste is washed first with cold pH 8.0 0.05 M sodium phosphate buffer and then with cold distilled water. From 409 liters of broth, 2,234 grams of washed cell paste are obtained.

The cell paste is then suspended in sufficient distilled water to provide a suspension containing approximately 44 grams of wet cell paste/100 ml. 530 cc. of this cell suspension is shell frozen in suitable containers using a Dry Ice-acetone bath. After drying in vacuum for 72 hours, 62 grams of lyophilized cells are obtained. These cells have an L-asparaginase content, based on an assay at pH 5.0, of 12,360 units/gram.

(b) Recovery of L-asparaginase from wet cells 50 ml. of wet cell suspension (about 10% of *E. coli* B cell suspension) obtained in step (a) are homogenized with 50 ml. of 0.05 M tris buffer pH 8.5 containing 5 mgs. (0.1%) of lysozyme. The homogenized cell suspension is heated to 37° and incubated at same temperature for a period of two hours with occasional shaking. After ½ and 2 hours, aliquots of incubation mixture are withdrawn and cooled to 5°. The cell debris is removed by centrifugation. Based on an assay at pH 5.0 the clarified cell-free extracts are found to contain 274 and 390 units per ml. respectively. This is respectively 35 and 50% of that obtained by sonic disruption of the wet cell suspension. Purification is accomplished by the sequence of steps outlined in Example 1.

(c) Recovery of L-asparaginase from lyophilized cells 5 grams of *E. coli* B lyophilized cells obtained in step (a) are homogenized with 100 ml. of 0.05 M tris buffer pH 8.5 containing 5 mgs. (0.1%) of lysozyme. The homogenized cell suspension is heated to 37° and incubated for a period of two hours with occasional shaking. After ½ and 2 hours aliquots of incubation mixture are withdrawn and cooled to 5°. The cell debris is removed by centrifugation and the clarified extract assayed. Based on an assay at pH 5.0 the cell-free extracts of the lyophilized cells are found to contain 4200 and 4400 units/gm. respectively. This represents respectively 81 and 85% of that obtained by sonic disruption of the lyophilized cells. Purification is accomplished by the sequence of steps outlined in Example 1.

What is claimed is:

1. A process for obtaining L-asparaginase which comprises treating a cell-free extract derived from cells of *Escherichia coli* with acetone and recovering the L-asparaginase obtained.

2. The process of claim 1 wherein the acetone treatment is carried out in the presence of ammonium sulfate.

3. The process of claim 1 wherein the cell-free extract is derived from dried cells.

4. The process of claim 2 wherein the *Escherichia coli* is *Escherichia coli* B.

References Cited

UNITED STATES PATENTS 3,440,142   4/1969   Teller _____ 195—66

LIONEL M. SHAPIRO, Primary Examiner